(12) United States Patent
Shishihara et al.

(10) Patent No.: US 10,948,012 B2
(45) Date of Patent: Mar. 16, 2021

(54) THRUST ROLLER BEARING (71) Applicant: JTEKT CORPORATION, Osaka (JP)

(72) Inventors: Yuki Shishihara, Kashiwara (JP); Shigeo Kamamoto, Kashiwara (JP); Junji Murata, Kashiba (JP)

(73) Assignee: JTEKT CORPORATION, Osaka (JP)

(*) Notice: Subject to any disclaimer, the term of this patent is extended or adjusted under 35 U.S.C. 154(b) by 0 days.

(21) Appl. No.: 16/792,078

(22) Filed: Feb. 14, 2020

(65) Prior Publication Data

US 2020/0271156 A1 Aug. 27, 2020

(30) Foreign Application Priority Data

Feb. 27, 2019 (JP) .............................. JP2019-033896
Feb. 27, 2019 (JP) .............................. JP2019-034293

(51) Int. Cl.
*F16C 19/30* (2006.01)
*F16C 33/46* (2006.01)
*F16C 33/34* (2006.01)

(52) U.S. Cl.
CPC ............ F16C 19/305 (2013.01); F16C 33/34 (2013.01); F16C 33/4676 (2013.01); F16C 33/4682 (2013.01); *F16C 33/4605* (2013.01)

(58) Field of Classification Search
CPC ........ F16C 19/30; F16C 19/305; F16C 33/34; F16C 33/4605; F16C 33/4676; F16C 33/4682
See application file for complete search history.

(56) References Cited

U.S. PATENT DOCUMENTS 3,963,285 A * 6/1976 Kellstrom ............... F16C 19/26
  384/450
4,077,683 A * 3/1978 Bhateja ................. F16C 19/305
  384/623
2019/0368542 A1 12/2019 Shishihara et al.

FOREIGN PATENT DOCUMENTS

JP 2016-200266 A 12/2016

* cited by examiner

*Primary Examiner* — Phillip A Johnson
(74) *Attorney, Agent, or Firm* — Oliff PLC (57) ABSTRACT

A thrust roller bearing includes a plurality of rollers and a cage. Each cage pocket includes a first side surface, and a second side surface. The roller and the cage are configured to satisfy the following expression (1).

$$(Y1+Y2)/X < \tan(3 \times \pi/180) \quad (1)$$

Y1 represents a clearance, before skewing, between a first contact point of the roller at which the roller contacts the first side surface when the roller is skewed toward one side and the first side surface, Y2 represents a clearance, before skewing, between a second contact point of the roller at which the roller contacts the second side surface when the roller is skewed toward the one side and the second side surface, and X represents a difference between the radius of a first imaginary circle passing through the first contact point and the radius of a second imaginary circle passing through the second contact point.

3 Claims, 9 Drawing Sheets

THRUST ROLLER BEARING

INCORPORATION BY REFERENCE

The disclosure of Japanese Patent Application No. 2019-034293 filed on Feb. 27, 2019 and Japanese Patent Application No. 2019-033896 filed on Feb. 27, 2019, each including the specification, drawings and abstract, is incorporated herein by reference in its entirety.

BACKGROUND

1. Technical Field

The disclosure relates to thrust roller bearings.

2. Description of Related Art

Thrust roller bearings can receive an axial load generated between a first member and a second member that rotate relative to each other. The thrust roller bearings can be reduced in size especially when their rollers are needle rollers. The thrust roller bearings also have large load capacity and can cope with high-speed rotation. The thrust roller bearings are not only used for transmissions of automobiles and industrial construction machinery etc., but also widely used for other rotating devices (see Japanese Unexamined Patent Application Publication No. 2018-66501 (JP 2018-66501 A)).

SUMMARY

When a thrust roller bearing (hereinafter sometimes simply referred to as the "bearing") rotates, the rollers roll between the raceway surface of the first member and the raceway surface of the second member. Cylindrical rollers try to move straight along the raceway surfaces. However, the rollers are accommodated in cage pockets of the cage, and the cage regulates movement of the rollers so that the rollers move in the circumferential direction.

The cage pocket is designed to have an appropriate shape so as not to hinder rotation of the roller. That is, an appropriate clearance is provided between the cage pocket and the outer peripheral surface of the roller. It is desirable that the roller be held at an ideal position in the cage pocket. However, the roller may be skewed due to the clearance. When the roller is skewed, the roller, for example, may locally come into contact with the cage pocket, which may cause an increase in contact pressure and an increase in sliding frictional resistance. Such an increase in sliding frictional resistance in the contact portion between the cage and the cage pocket hinders reduction in torque of the bearing.

In recent years, reduction in torque of thrust roller bearings has been required for various types of rotating devices in order to improve rotation efficiency, that is, to reduce rotation loss. It is therefore desired to minimize the sliding frictional resistance in the contact portion between the cage and the cage pocket. It is an object of the disclosure to provide a thrust roller bearing capable of maintaining reduction in torque.

An aspect of the present disclosure relates to a thrust roller bearing including a plurality of rollers and a cage. The rollers are arranged between a first raceway surface and a second raceway surface that face each other. The cage has a plurality of cage pockets each holding the roller such that a central axis of the roller extends in a radial direction. The roller includes a cylindrical outer peripheral surface, a first end face on a radial outer side, and a second end face on a radial inner side. The cage pocket includes an outer surface having a protrusion that is contactable with the first end face, an inner surface facing the second end face, a first side surface on one side and facing the cylindrical outer peripheral surface, and a second side surface on the other side and facing the cylindrical outer peripheral surface. The roller and the cage are configured to satisfy the following expression (1)

$$(Y1+Y2)/X < \tan(3 \times \pi/180) \quad (1)$$

where Y1 represents a clearance, before skewing, between a first contact point of the roller at which the roller contacts the first side surface when the roller is skewed toward one side and the first side surface, Y2 represents a clearance, before skewing, between a second contact point of the roller at which the roller contacts the second side surface when the roller is skewed toward the one side and the second side surface, and X represents a difference between a radius of a first imaginary circle about a central axis of the cage that passes through the first contact point and a radius of a second imaginary circle about the central axis of the cage that passes through the second contact point.

The inventors found through their extensive research on thrust roller bearings that, even when rollers are skewed, running torque is prevented from becoming extremely large as long as the tilt angle of the central axis of the roller with respect to a normal rotation axis of the roller is less than $3 \times \pi/180$ radians (less than 3°).

When the thrust roller bearing of the present disclosure rotates, each roller rolls on the first raceway surface and the second raceway surface with the first end face of the roller being in contact with the protrusion of the cage pocket by a centrifugal force. The roller may be skewed in the cage pocket. However, even when the roller is skewed in the cage pocket, the tilt angle of the central axis of the roller with respect to the normal rotation axis of the roller is less than $3 \times \pi/180$ radians (less than 3°) as the shapes of the roller and the cage pocket have a relationship satisfying the expression (1). Accordingly, the running torque of the thrust roller bearing is prevented from becoming extremely large even when the roller is skewed in the cage pocket. Reduction in torque is thus maintained.

In the thrust roller bearing, the roller may include a cylindrical portion located in the middle of the roller in an axial direction of the roller and formed so as to have a straight generatrix, an outer crowning portion located radially outward of the cylindrical portion and formed so as to have an arc-shaped generatrix, and an inner crowning portion located radially inward of the cylindrical portion and formed so as to have an arc-shaped generatrix. Each of the first side surface and the second side surface may include a recessed surface that is provided in the middle of the cage pocket in the radial direction and that is not contactable with the roller, and flat surfaces that are provided on radial outer and inner sides in the cage pocket and that is contactable with the roller. A first dimension may be larger than a second dimension. The first dimension is a dimension in the radial direction from the first end face that is contactable with the protrusion to a boundary between the outer crowning portion and the cylindrical portion. The second dimension is a dimension in the radial direction from a contact point of the protrusion with the first end face to a boundary between the flat surface on the radial outer side and the recessed surface.

In this case, the first dimension is larger than the second dimension. Accordingly, when the roller is skewed, the outer crowning portion of the roller comes into contact with the flat surface of the cage pocket on the radial outer side. Since the outer crowning portion is formed so as to have an arc-shaped generatrix, the roller and the cage contact (point contact) each other in a radial outer region of the cage pocket in such a manner that a contact ellipse is generated. The sliding frictional resistance in the contact portion between the roller and the cage is therefore reduced, and reduction in torque is achieved.

In the thrust roller bearing, the outer crowning portion may include a first part adjacent to the cylindrical portion and defined by an arc-shaped generatrix with a first radius of curvature, and a second part adjacent to the first part and defined by an arc-shaped generatrix with a second radius of curvature smaller than the first radius of curvature. A third dimension may be smaller than the second dimension. The third dimension is a dimension in the radial direction from the first end face that is contactable with the protrusion to a boundary between the first part and the second part.

In this case, the first part of the outer crowning portion of the roller contacts the flat surface of the cage pocket on the radial outer side. The radius of curvature of the arc-shaped generatrix of the first part is larger than that of the arc-shaped generatrix of the second part. Accordingly, a relatively large contact ellipse is generated between the flat surface and the first part. A surface pressure in the contact portion between the roller and the cage is thus reduced, and wear is restrained.

According to the disclosure, the running torque of the thrust roller bearing is prevented from becoming extremely large, and reduction in torque is maintained.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Description of Overall Configuration of Thrust Roller Bearing

Figure 1:
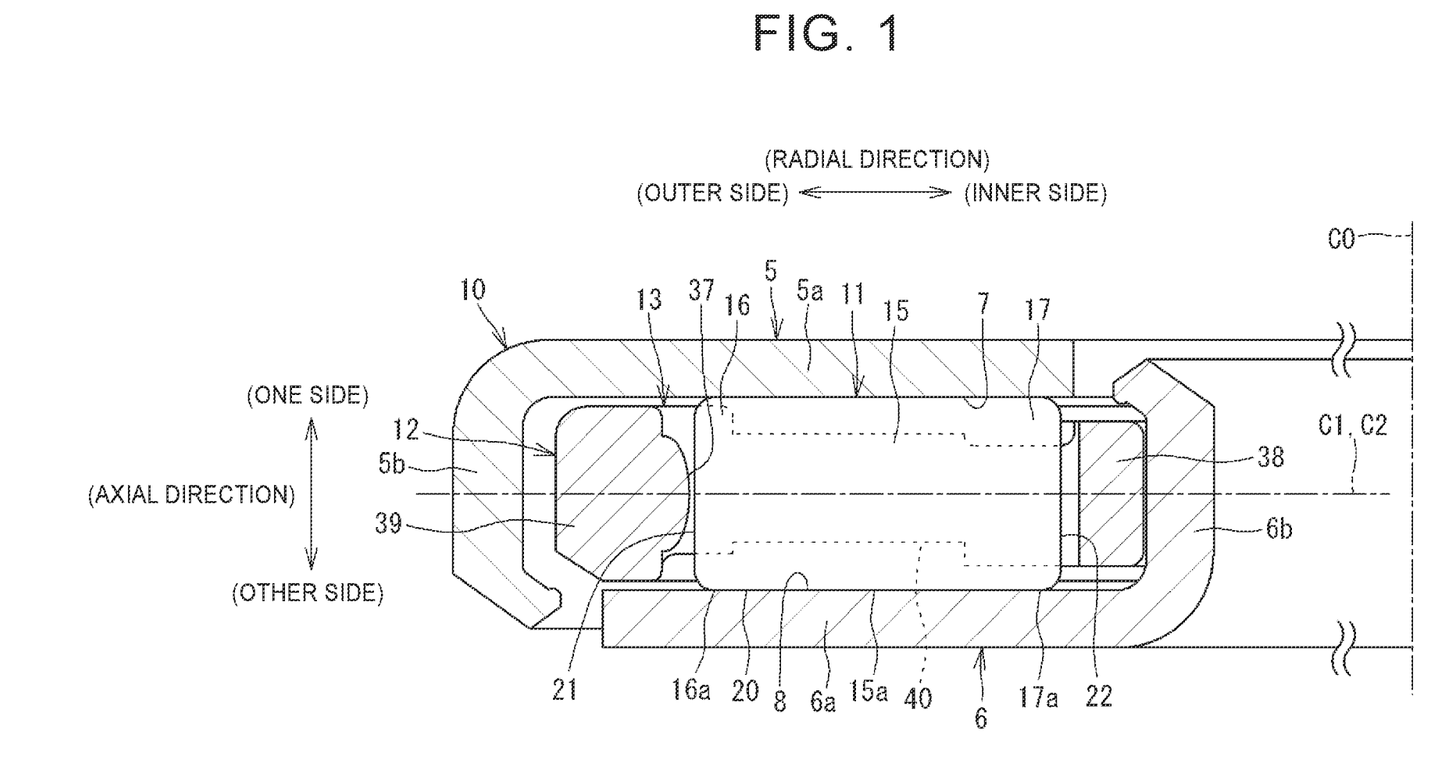
FIG. 1 is a sectional view showing an example of a thrust roller bearing.

FIG. 1 is a sectional view showing an example of a thrust roller bearing. A thrust roller bearing 10 (hereinafter sometimes simply referred to as the "bearing 10") shown in FIG. 1 includes an annular cage 12 and a plurality of rollers 11. The bearing 10 of the present disclosure further includes an annular first bearing ring (housing washer) 5 located on one side in the axial direction (the upper side in FIG. 1) of the bearing 10 and an annular second bearing ring (shaft washer) 6 located on the other side in the axial direction (the lower side in FIG. 1) of the bearing 10.

The first bearing ring 5 and the second bearing ring 6 rotate relative to each other about the central axis C0 of the bearing 10. In the present disclosure, the direction along the central axis C0 of the bearing 10 is referred to as the "axial direction." The axial direction includes a direction parallel to the central axis C0. The direction perpendicular to the central axis C0 is a "radial direction about the central axis C0" and herein simply referred to as the "radial direction." The circumferential direction about the central axis C0, that is, the direction of the relative rotation is the "circumferential direction of the bearing 10" and is simply referred to as the "circumferential direction." In the present disclosure, it is assumed that the central axis of the cage 12 matches the central axis C0 of the bearing 10.

The first bearing ring 5 includes an annular first body 5a and a short cylindrical first rib 5b extending from the radial outer end of the first body 5a toward the other side in the axial direction. The first body 5a has a flat annular first raceway surface 7 on the other side in the axial direction of the first body 5a. The second bearing ring 6 includes an annular second body 6a and a short cylindrical second rib 6b extending from the radial inner end of the second body 6a toward the one side in the axial direction. The second body 6a has a flat annular second raceway surface 8 on the one side in the axial direction of the second body 6a. The cage 12 and the rollers 11 are disposed between the first raceway surface 7 and the second raceway surface 8. When the bearing 10 rotates, the rollers 11 held by the cage 12 roll on the first raceway surface 7 and the second raceway surface 8.

In the bearing 10, the first bearing ring 5 and the second bearing ring 6 may be omitted. In this case, although not shown in the figure, a first member included in a device in which the bearing 10 is mounted serves as a substitute for the first bearing ring 5, and a second member included in the device serves as a substitute for the second bearing ring 6. The first member has the annular first raceway surface 7, and the second member has the annular second raceway surface 8.

Figure 2:
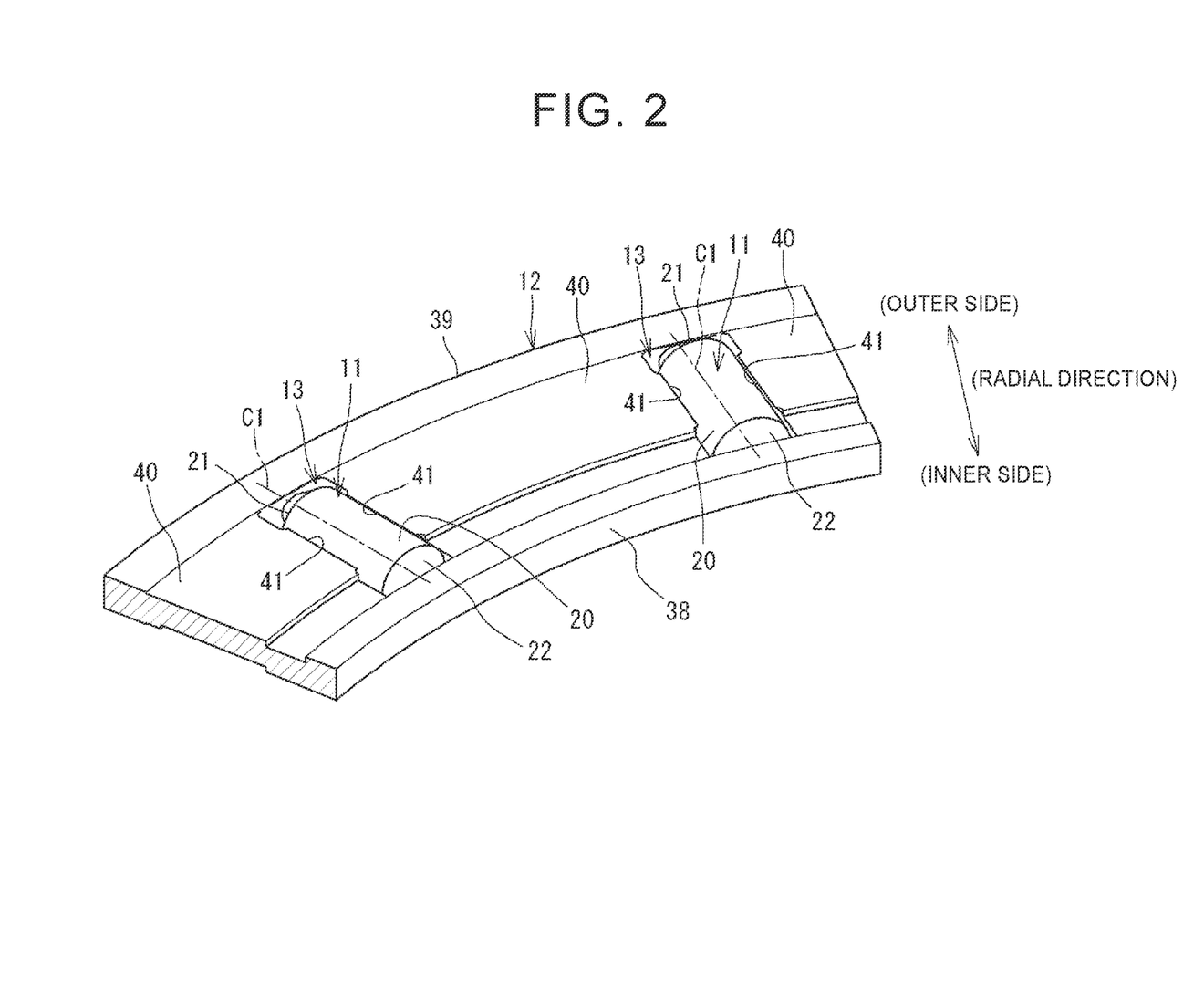
FIG. 2 is a perspective view of a part of a cage holding rollers.

FIG. 2 is a perspective view showing a part of the cage 12 holding the rollers 11. The cage 12 has a plurality of cage pockets 13. The cage pockets 13 are arranged in a radial pattern about the central axis C0 (see FIG. 1). The cage 12 includes an inner annular member 38 disposed on the radial inner side, an outer annular member 39 disposed on the radial outer side, and a plurality of cage bars 40 connecting the inner annular member 38 and the outer annular member 39. The space surrounded by the cage bars 40 adjacent to each other in the circumferential direction, the inner annular member 38, and the outer annular member 39 is the cage pocket 13.

Each roller 11 has a cylindrical shape. In FIGS. 1 and 2, the roller 11 has a first end face 21 on the radial outer side, a second end face 22 on the radial inner side, and an outer peripheral surface 20 of the roller 11. The roller 11 of the present disclosure may be a needle roller or may be a cylindrical roller or a long cylindrical roller. A single roller 11 is accommodated in each cage pocket 13. The roller 11 is held in each cage pocket 13 such that the central axis C1 of the roller 11 matches the radial direction.

As described above, in the bearing 10 of the present disclosure, the rollers 11 are arranged between the first raceway surface 7 and the second raceway surface 8 which face each other. The cage 12 has the plurality of cage pockets 13. Each cage pocket 13 holds the roller 11 such that the central axis C1 of the roller 11 extends in the radial direction. There is an appropriate clearance between the outer peripheral surface 20 of the roller 11 and the cage bar 40. The rollers 11, the first bearing ring 5, and the second bearing ring 6 are made of steel. Although the cage 12 may be made of metal (steel), the cage 12 of the present disclosure are made of resin in order to reduce sliding frictional resistance.

Description of Cage Pocket 13 and Roller 11

Figure 3:
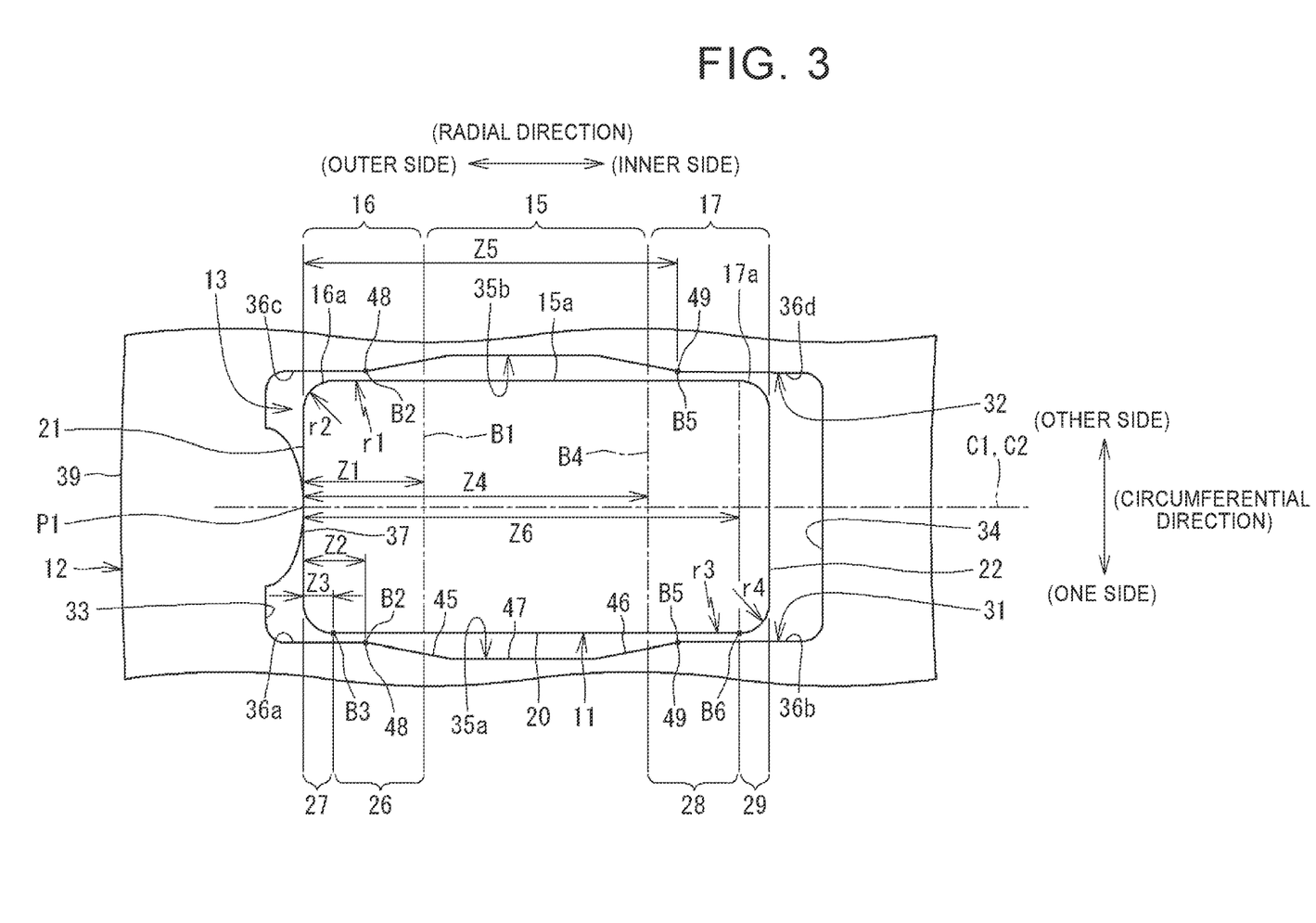
FIG. 3 is a diagram showing a cage pocket and a roller in a section perpendicular to a central axis of the thrust roller bearing and including a central axis of the roller.

The shape of the roller 11 will be further described. FIG. 3 shows the cage pocket 13 and the roller 11 in a section perpendicular to the central axis C0 (see FIG. 1) of the bearing 10 and including the central axis C1 of the roller 11. The roller 11 has a cylindrical portion 15 in the middle and an outer crowning portion 16 and an inner crowning portion 17 that are located on respective sides of the cylindrical portion 15.

The cylindrical portion 15 is a portion located in the middle in the axial direction of the roller 11 and is formed so as to have a straight generatrix. An outer peripheral surface 15a of the cylindrical portion 15 has a cylindrical shape parallel to the central axis C1 of the roller 11. The outer crowning portion 16 is a portion located next to, specifically, radially outward of, the cylindrical portion 15 and is formed so as to have an arc-shaped generatrix. An outer peripheral surface 16a of the outer crowning portion 16 has such a shape that the diameter gradually decreases toward to the first end face 21. The inner crowning portion 17 is a portion located next to, specifically, radially inward of, the cylindrical portion 15 and is formed so as to have an arc-shaped generatrix. An outer peripheral surface 17a of the inner crowning portion 17 has such a shape that the diameter gradually decreases toward the second end face 22.

The outer peripheral surface 15a of the cylindrical portion 15, the outer peripheral surface 16a of the outer crowning portion 16, and the outer peripheral surface 17a of the inner crowning portion 17 are included in the outer peripheral surface 20 of the roller 11.

The outer crowning portion 16 is composed of two parts. That is, the outer crowning portion 16 has a first part 26 adjacent to the cylindrical portion 15 and a second part 27 adjacent to the first part 26. The outer peripheral surface of the first part 26 is formed so as to have an arc-shaped generatrix with a first radius of curvature r1 in a section including the central axis C1 of the roller 11. The outer peripheral surface of the second part 27 is formed so as to have an arc-shaped generatrix with a second radius of curvature r2 smaller than the first radius of curvature r1 in a section including the central axis C1 of the roller 11. The outer peripheral surface 15a of the cylindrical portion 15 and the outer peripheral surface of the first part 26 connect to each other in a differentiable manner in a section including the central axis C1 of the roller 11. The outer peripheral surface of the first part 26 and the outer peripheral surface of the second part 27 connect to each other in a differentiable manner in a section including the central axis C1 of the roller 11.

The inner crowning portion 17 is composed of two parts. That is, the inner crowning portion 17 has a third part 28 adjacent to the cylindrical portion 15 and a fourth part 29 adjacent to the third part 28. The outer peripheral surface of the third part 28 is formed so as to have an arc-shaped generatrix with a third radius of curvature r3 in a section including the central axis C1 of the roller 11. The outer peripheral surface of the fourth part 29 formed so as to have an arc-shaped generatrix with a fourth radius of curvature r4 smaller than the third radius of curvature r3 in a section including the central axis C1 of the roller 11. The outer peripheral surface 15a of the cylindrical portion 15 and the outer peripheral surface of the third part 28 connect to each other in a differentiable manner in a section including the central axis C1 of the roller 11. The outer peripheral surface of the third part 28 and the outer peripheral surface of the fourth part 29 connect to each other in a differentiable manner in a section including the central axis C1 of the roller 11. In the present embodiment, the first radius of curvature r1 and the third radius of curvature r3 have the same value, and the second radius of curvature r2 and the fourth radius of curvature r4 have the same value.

Figure 4:
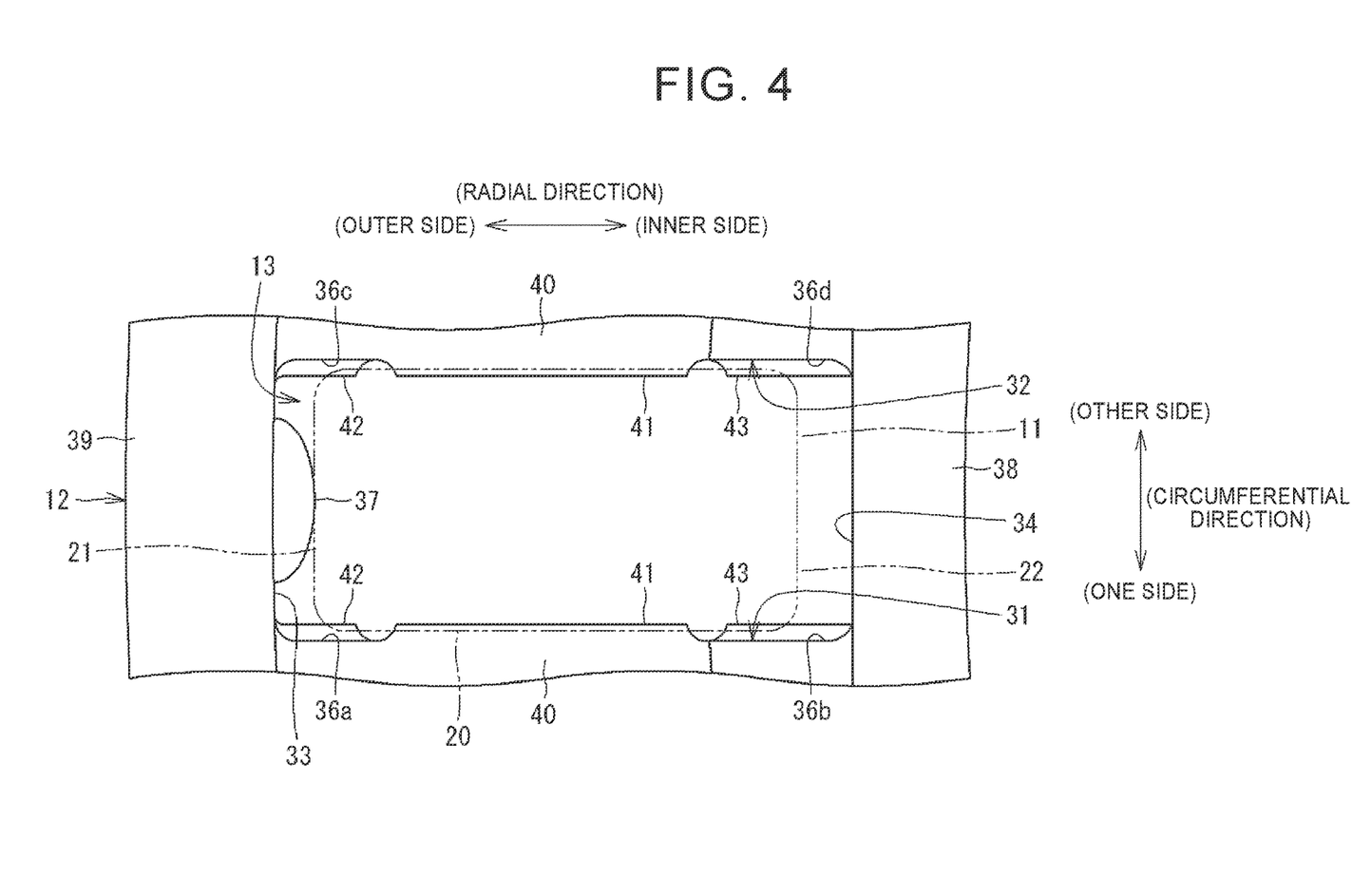
FIG. 4 is a diagram of the cage pocket of the cage as viewed from one side in the axial direction.
Figure 5:
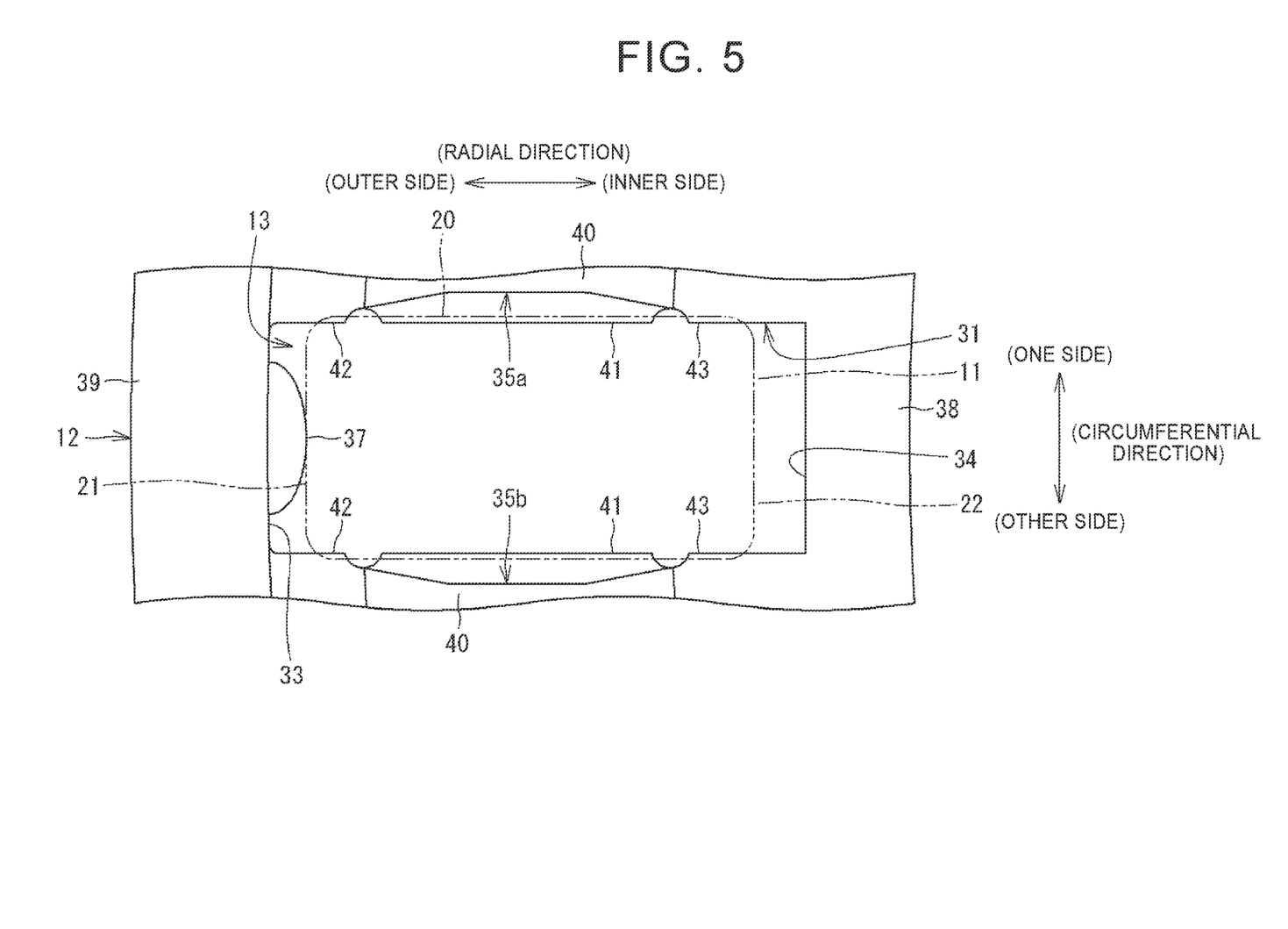
FIG. 5 is a diagram of the cage pocket of the cage as viewed from the other side in the axial direction.

FIG. 4 shows the cage pocket 13 of the cage 12 as viewed from the one side in the axial direction. FIG. 5 shows the cage pocket 13 of the cage 12 as viewed from the other side in the axial direction. In FIGS. 4 and 5, the roller 11 is shown by a hidden outline (long dashed double-short dashed line). The cage pocket 13 is an area surrounded by an outer surface 33, an inner surface 34, and a pair of side surfaces 31, 32.

The outer surface 33 is configured of a radial inner surface of the outer annular member 39. The outer surface 33 has a protrusion 37 having a curved surface. The protrusion 37 is contactable with the first end face 21 of the roller 11. The protrusion 37 of the present disclosure has, as a contact surface with the roller 11, a curved surface conforming to a spherical surface. The radial innermost position of the curved surface of the protrusion 37 is located on an imaginary plane that is at the same distance from the opposing surfaces of the cage bars 40 adjacent to each other in the circumferential direction. When the bearing 10 rotates, the roller 11 tries to move radially outward due to the centrifugal force. The first end face 21 of the roller 11 thus comes into point contact with the protrusion 37, so that the roller 11 is positioned in the radial direction. The inner surface 34 is configured of a radial outer surface of the inner annular member 38. The inner surface 34 faces the second end face 22 of the roller 11.

The first side surface 31 on one side in the circumferential direction is configured of such a surface of the cage bar 40 located on one side in the circumferential direction of the roller 11 that faces toward the other side in the circumferential direction. The first side surface 31 faces the outer peripheral surface 20 of the roller 11. The second side surface 32 on the other side in the circumferential direction is configured of such a surface of the cage bar 40 located on the other side in the circumferential direction of the roller 11 that faces toward the one side in the circumferential direction. The second side surface 32 faces the outer peripheral surface 20 of the roller 11.

As shown in FIG. 4, a pair of first protruding portions 41 are provided in each cage pocket 13 so as to face each other in the circumferential direction. Each of the first protruding portions 41 is provided in the middle in the radial direction of the cage bar 40. Each of the first protruding portions 41 is provided on the one side of the cage bar 40 in the axial direction so as to protrude in the circumferential direction. The interval between the pair of first protruding portions 41 in the cage pocket 13 is smaller than the diameter of the roller 11. The first protruding portions 41 thus prevent the roller 11 accommodated in the cage pocket 13 from falling off toward the one side in the axial direction.

As shown in FIG. 5, a pair of second protruding portions 42 are provided in each cage pocket 13 so as to face each other in the circumferential direction. Each of the second protruding portions 42 is provided on the radial outer side of the cage bar 40. Each of the second protruding portions 42 is provided on the other side in the axial direction of the cage bar 40 so as to protrude in the circumferential direction. The interval between the second protruding portions 42 is smaller than the diameter of the roller 11. The second protruding portions 42 thus prevent the roller 11 accommodated in the cage pocket 13 from falling off toward the other side in the axial direction. As shown in FIG. 5, a pair of third protruding portions 43 are provided in each cage pocket 13 so as to face each other in the circumferential direction. Each of the third protruding portions 43 is provided on the radial inner side of the cage bar 40. Each of the third protruding portions 43 is provided on the other side of the cage bar 40 in the axial direction so as to protrude in the circumferential direction. The interval between the pair of third protruding portions 43 is smaller than the diameter of the roller 11. The third protruding portions 43 thus prevent the roller 11 accommodated in the cage pocket 13 from falling off toward the other side in the axial direction.

FIG. 3 shows the state in which the central axis C2 of the cage pocket 13 which extends in the radial direction and the central axis C1 of the roller 11 match each other (hereinafter referred to as the aligned state). The central axis C2 of the cage pocket 13 is such a line extending in the radial direction that is located on an imaginary plane located at the same distance from the opposing surfaces of the cage bars 40 adjacent to each other in the circumferential direction and that includes the radial innermost position of the protrusion 37. In this state, the roller 11 protrudes beyond the surface on the one side in the axial direction of the cage 12 toward the one side in the axial direction, and also protrudes beyond the surface on the other side in the axial direction of the cage 12 toward the other side in the axial direction. In this state, there is a clearance between the outer peripheral surface 20 of the roller 11 and each of the side surfaces 31, 32 of the cage pocket 13. The first side surface 31 of the cage pocket 13 on the one side in the circumferential direction has a recessed surface 35a in the middle and flat surfaces 36a, 36b on respective sides of the recessed surface 35a. Like the first side surface 31 on the one side in the circumferential direction, the second side surface 32 on the other side in the circumferential direction has a recessed surface 35b in the middle and flat surfaces 36c, 36d on respective sides of the recessed surface 35b. The first side surface 31 and the second side surface 32 have the same configuration, and the first side surface 31 on the one side in the circumferential direction will be described below as an example.

The flat surface 36a is a surface that is provided on the radial outer side in the cage pocket 13 and that is contactable with the roller 11. The flat surface 36b is a surface that is provided on the radial inner side in the cage pocket 13 and that is contactable with the roller 11. The recessed surface 35a is provided in the middle in the radial direction of the cage pocket 13. The recessed surface 35a is a surface that is recessed more than the flat surfaces 36a, 36b and that is not contactable with the roller 11. The recessed surface 35a includes an outer tilted surface 45, an inner tilted surface 46, and a middle surface 47 provided between the outer tilted surface 45 and the inner tilted surface 46. The outer tilted surface 45 is tilted such that the circumferential width of the cage pocket 13 gradually increases from the flat surface 36a on the radial outer side. The inner tilted surface 46 is tilted such that the circumferential width of the cage pocket 13 gradually increases from the flat surface 36b on the radial inner side. In the aligned state, the flat surfaces 36a, 36b and the middle surface 47 are parallel to the central axis C1 of the roller 11. Each of the flat surfaces 36a, 36b is configured of a surface that is flat in the radial and axial directions except for the second protruding portion 42 or the third protruding portion 43 (see FIGS. 4 and 5).

A convex round portion (round chamfer) 48 is provided at a boundary B2 between the flat surface 36a on the radial outer side and the recessed surface 35a (the outer tilted surface 45). A convex round portion (round chamfer) 49 is provided at a boundary B5 between the flat surface 36b on the radial inner side and the recessed surface 35a (the inner tilted surface 46). Regarding the round portions at the boundaries B2, B5, the second side surface 32 on the other side in the circumferential direction has a configuration similar to that of the first side surface 31 on the one side in the circumferential direction. That is, a convex round portion 48 is provided at the boundary B2 between the flat surface 36c on the radial outer side and the recessed surface 35b, and a convex round portion 49 is provided at the boundary B5 between the flat surface 36d on the radial inner side and the recessed surface 35b. The dimensions of the round portions 48, 49, namely the dimensions of the round chamfers, are, e.g., 1 millimeter or more and 5 millimeters or less.

Figure 6:
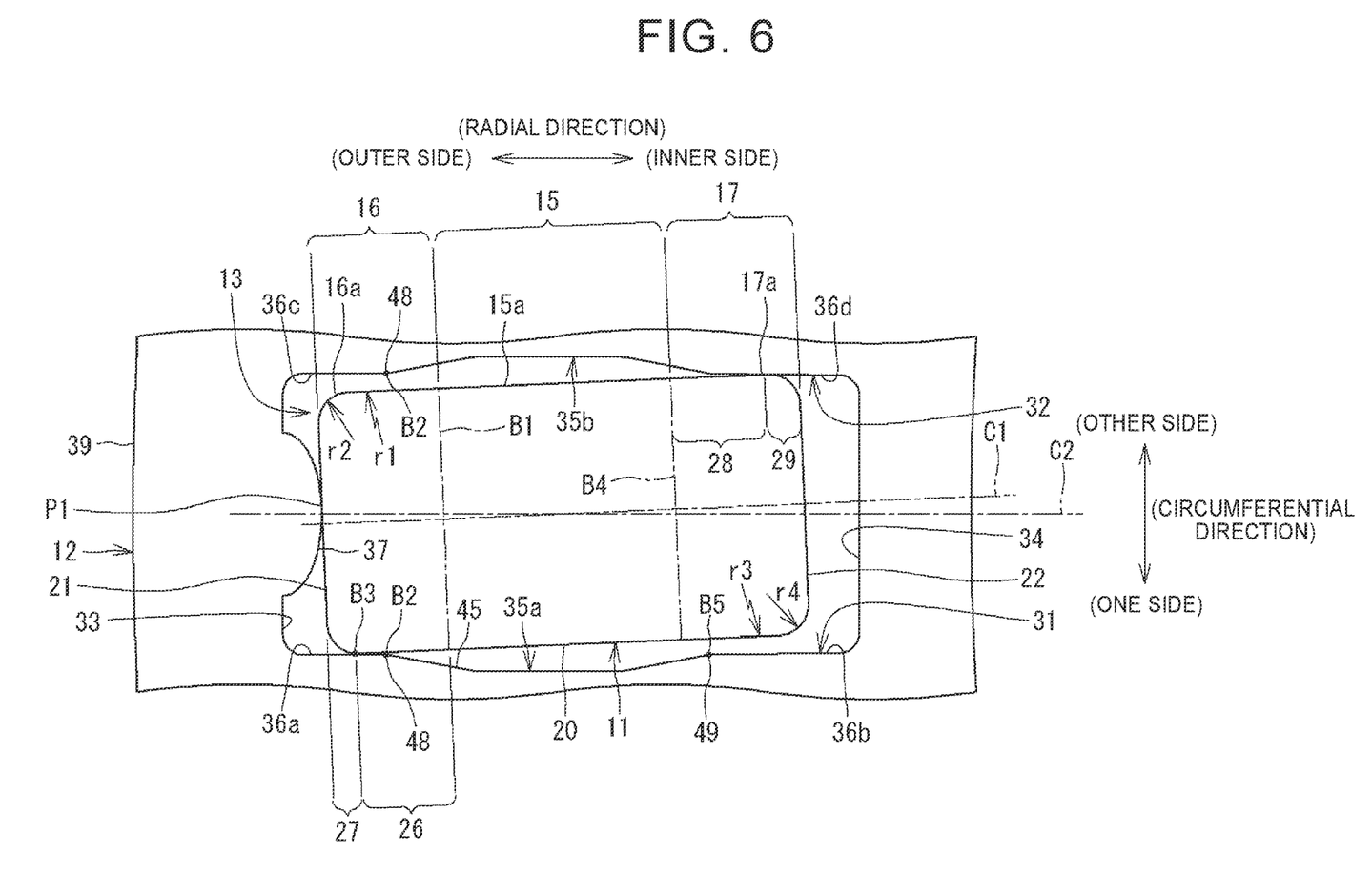
FIG. 6 is a sectional view showing the roller in a tilted state.

FIG. 6 shows the state in which the central axis C1 of the roller 11 is tilted with respect to the central axis C2 of the cage pocket 13 that extends in radial direction (hereinafter referred to as the "misaligned state"). The misaligned state is caused when the roller 11 is skewed in the cage pocket 13. In the present disclosure, the term "skew" means that the roller 11 is tilted with respect to the normal rotation axis of the roller 11. The normal rotation axis matches the central axis C2 of the cage pocket 13. When the bearing 10 rotates, the first end face 21 of the roller 11 comes into contact with the protrusion 37 of the cage pocket 13 due to the centrifugal force, and the roller 11 rolls on the first raceway surface 7 and the second raceway surface 8 (see FIG. 1). As shown in FIG. 6, when the roller 11 is tilted in the cage pocket 13, the outer crowning portion 16 of the roller 11 comes into contact with the flat surface 36a and the inner crowning portion 17 of the roller 11 comes into contact with the flat surface 36d with the first end face 21 of the roller 11 being in contact with the protrusion 37. In this state, the roller 11 is positioned in the cage pocket 13 and rotates.

Figure 7:
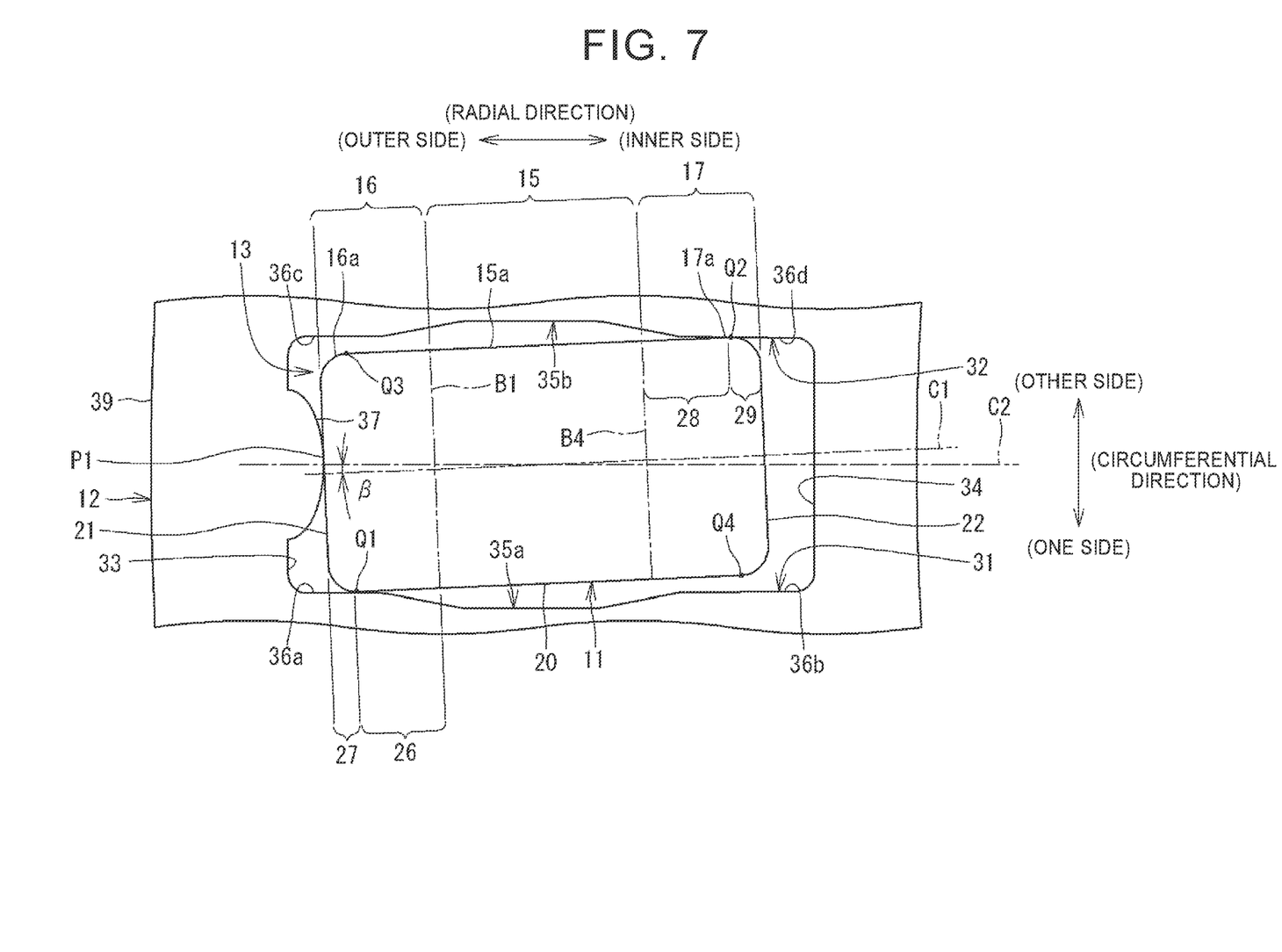
FIG. 7 is a sectional view showing the roller in a tilted state.

FIG. 7 shows the cage pocket 13 and the roller 11 in a section perpendicular to the central axis C0 (see FIG. 1) of the bearing 10 and including the central axis C1 of the roller 11. Like FIG. 6, FIG. 7 shows the state in which the central axis C1 of the roller 11 is tilted with respect to the central axis C2 of the cage pocket 13 that extends in the radial direction. That is, FIG. 7 shows the roller 11 having been skewed toward one side.

As described above, each of the outer crowning portion 16 and the inner crowning portion 17 is formed so as to have an arc-shaped generatrix. When the roller 11 is skewed in the cage pocket 13, the outer crowning portion 16 comes into point contact with the flat surface 36a of the first side surface 31, and the inner crowning portion 17 comes into point contact with the flat surface 36d of the second side surface 32. As will also be described later, the outer crowning portion 16 and the inner crowning portion 17 contact (point contact) the flat surface 36a and the flat surface 36d in such a manner that a contact ellipse is generated. A first contact point Q1 refers to the contact point of the outer crowning portion 16 with the flat surface 36a, and a second contact point Q2 refers to the contact point of the inner crowning portion 17 with the flat surface 36d.

Figure 8:
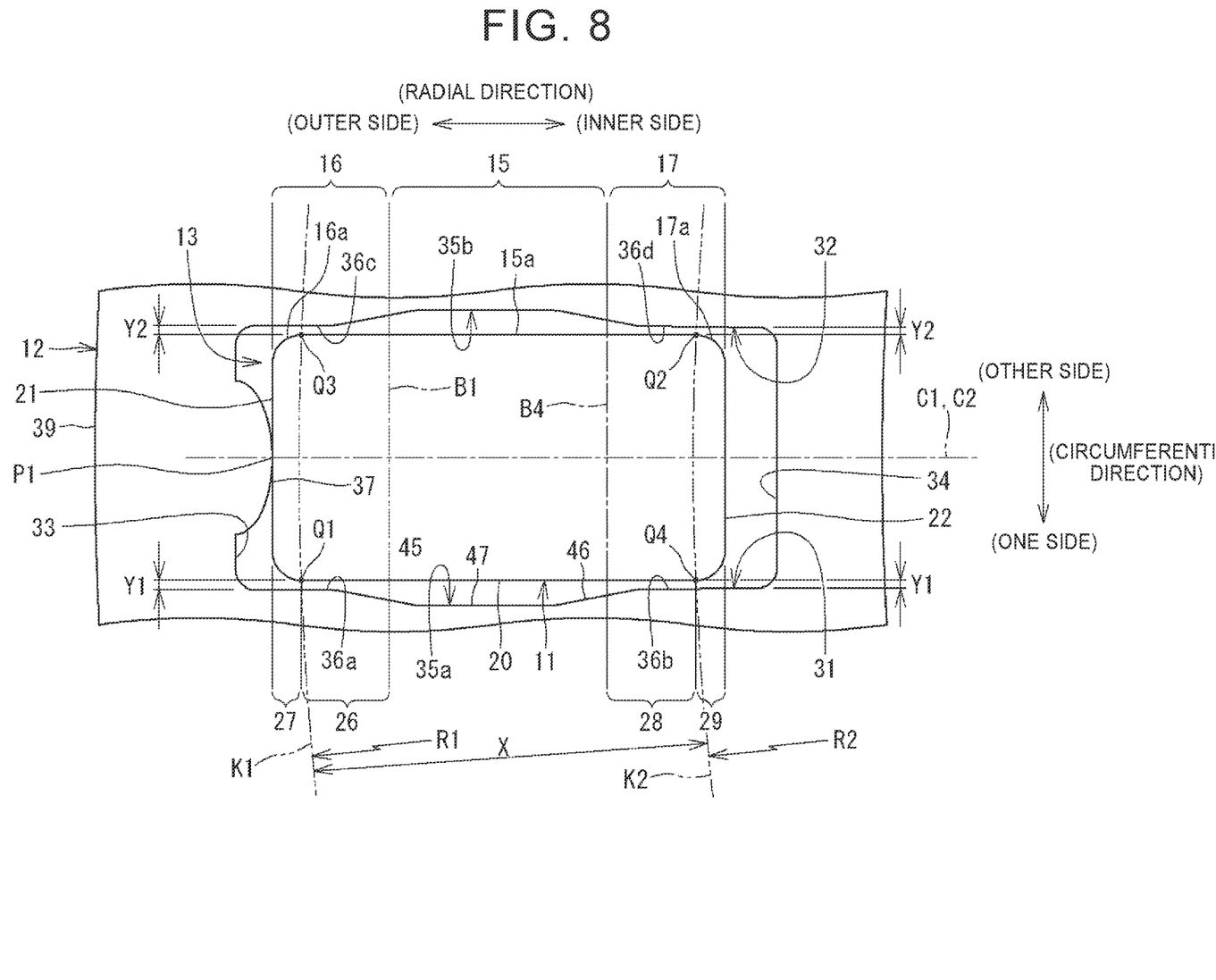
FIG. 8 is a diagram of the cage pocket and the roller in a section perpendicular to the central axis of the thrust roller bearing and including the central axis of the roller.

FIG. 8 shows the cage pocket 13 and the roller 11 in a section perpendicular to the central axis C0 (see FIG. 1) of the bearing 10 and including the central axis C1 of the roller 11. FIG. 8 shows the aligned state (the state before skewing). As shown in FIG. 8, there is a predetermined clearance (Y1, Y2) between each of the first side surface 31 and the second side surface 32 of the cage pocket 13 and the outer peripheral surface 20 of the roller 11. The shape of the cage pocket 13 with respect to the shape of the roller 11, that is, the clearance, is designed so as to satisfy the following expression (1).

$$(Y1+Y2)/X < \tan(3 \times \pi/180) \quad (1)$$

In the expression (1), Y1, Y2, and X are defined as follows (see FIG. 8).

Y1: a clearance between the first contact point Q1 and the first side surface 31 (the flat surface 36a) before skewing Y2: a clearance between the second contact point Q2 and the second side surface 32 (the flat surface 36d) before skewing X: the difference between a radius R1 of a first imaginary circle K1 about the central axis C0 of the cage 12 that passes through the first contact point Q1 and a radius R2 of a second imaginary circle K2 about the central axis C0 of the cage 12 that passes through the second contact point Q2

That is, Y1 represents the clearance between the first contact point Q1 of the roller 11 at which the roller 11 contacts the first side surface 31 when the roller 11 is skewed toward the one side and the first side surface 31 before skewing. Y2 represents the clearance between the second contact point Q2 of the roller 11 at which the roller 11 contacts the second side surface 32 when the roller 11 is skewed toward the one side and the second side surface 32 before skewing. As shown in FIG. 8, the first contact point Q1 for defining Y1 is a position before skewing, and the second contact point Q2 for defining Y2 is a position before skewing. X is given by the expression "(R1−R2)."

When the roller 11 is skewed toward the other side, namely to the opposite side to that shown in FIG. 7, the outer crowning portion 16 comes into point contact with the flat surface 36c of the second side surface 32 (a third contact point Q3), and the inner crowning portion 17 comes into point contact with the flat surface 36b of the first side surface 31 (a fourth contact point Q4). In the state before skewing shown in FIG. 8, the clearance between the third contact point Q3 and the second side surface 32 (the flat surface 36c) has the same value as Y2, and the clearance between the fourth contact point Q4 and the first side surface 31 (the flat surface 36b) has the same value as Y1. The first imaginary circle K1 passes through the third contact point Q3, and the second imaginary circle K2 passes through the fourth contact point Q4.

Figure 9:
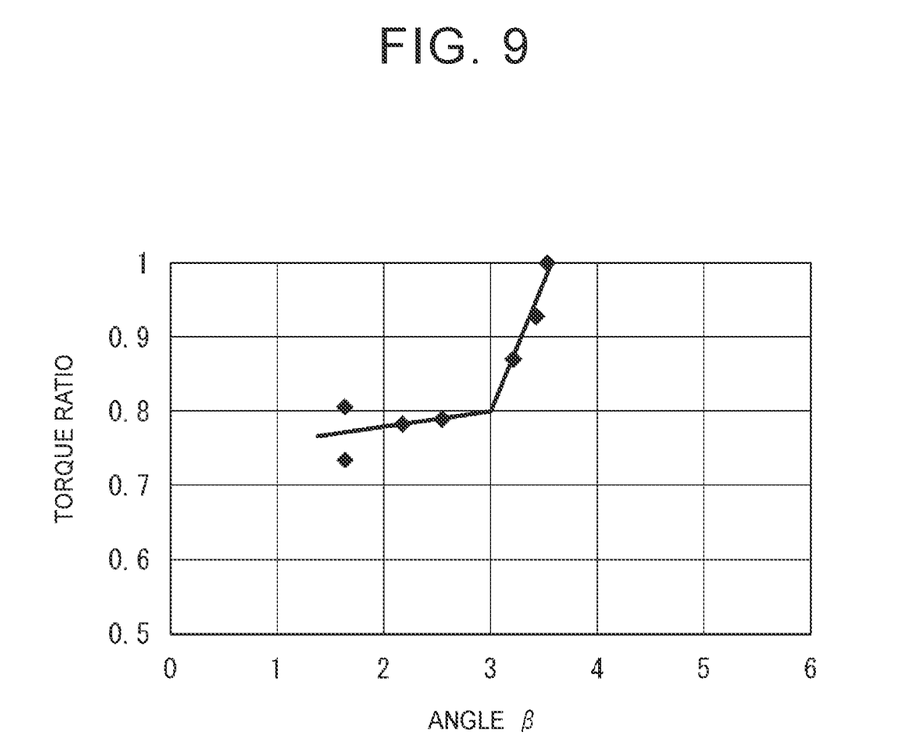
FIG. 9 is a graph showing the torque ratio of the thrust roller bearing.

FIG. 9 is a graph showing the torque ratio (running torque ratio) of the bearing 10. This graph was obtained experimentally. The abscissa of the graph represents an angle β (see FIG. 7) at which the central axis C1 of the roller 11 is tilted with respect to the normal rotation axis of the roller 11. The angle β is an angle (minor angle) formed by the central axis C2 of the cage pocket 13 that extends in the radial direction and the tilted central axis C1 of the roller 11. The ordinate represents a torque ratio on the assumption that the rotational resistance of the bearing 10 is "1" when the angle β is 3.5×π/180 radians (3.5°). As shown in FIG. 9, when the angle β becomes larger than 3×π/180 radians (3°), the torque ratio increases rapidly, that is, the rotational resistance of the bearing 10 increases. On the other hand, when the angle β is less than 3×π/180 radians (less than 3°), the torque ratio is relatively low, that is, the rotational resistance of the bearing 10 is small.

As described above, the inventors experimentally found through their extensive research that, even when the rollers 11 are skewed, running torque is prevented from becoming extremely large as long as the angle β is less than 3×π/180 radians (less than 3°).

When the shapes of the roller 11 and the cage pocket 13 have a relationship satisfying the expression (1), the angle β is less than 3×π/180 radians (less than 3°) even when the roller 11 is skewed in the cage pocket 13 as shown in FIG. 7. Accordingly, the running torque of the bearing 10 is prevented from becoming extremely large even when the roller 11 screws. Reduction in torque is thus maintained.

It is preferable to set Y1 and Y2 so that X is as large as possible within the range satisfying the expression (1). This is because, when the moment for skewing the roller 11 is constant, the contact force acting between the roller 11 and the cage 12 can be reduced by increasing X. The sliding frictional resistance due to the contact between the roller 11 and the cage 12 is thus further reduced.

Referring back to FIG. 3, the dimensions of each part of the roller 11 and the cage pocket 13 will be described. A first dimension Z1 of the roller 11 defined as follows is larger than a second dimension Z2 of the cage pocket 13 defined as follows (Z1>Z2).

First dimension Z1: the dimension in the radial direction from the first end face 21 of the roller 11 that is contactable with the protrusion 37 of the cage pocket 13 to a boundary B1 between the outer crowning portion 16 and the cylindrical portion 15.

Second dimension Z2: the dimension in the radial direction from the contact point P1 of the protrusion 37 of the cage pocket 13 with the first end face 21 of the roller 11 to the boundary B2 (the boundary B2 is the boundary between the flat surface 36a (36c) on the radial outer side and the recessed surface 35a (35b)).

As described above, the first dimension Z1 is larger than the second dimension Z2. Accordingly, when the bearing 10 rotates and the roller 11 is tilted in the cage pocket 13, the outer crowning portion 16 of the roller 11 comes into contact with the flat surface 36a of the cage pocket 13 on the radial outer side, as shown in FIG. 6. As described above, the outer crowning portion 16 is formed so as to have an arc-shaped generatrix. The outer crowning portion 16 of the roller 11 therefore contacts (point contacts) the flat surface 36a of the cage pocket 13 in such a manner that a contact ellipse is generated. This configuration reduces the sliding frictional resistance in the contact portion between the roller 11 and the cage 12 and achieves reduction in torque.

For example, although not shown in the figure, when the rotation direction of the bearing 10 is reversed and the roller 11 is tilted in the opposite direction to that shown in FIG. 6, the outer crowning portion 16 comes into contact with the opposite flat surface 36c. In this case as well, the outer crowning portion 16 of the roller 11 contacts (point contacts) the flat surface 36c of the cage pocket 13 in such a manner that a contact ellipse is generated.

In the present disclosure (see FIG. 3), a third dimension Z3 defined as follows is smaller than the second dimension Z2 (Z3<Z2).

Third dimension Z3: the dimension in the radial direction from the first end face 21 that is contactable with the protrusion 37 to the boundary B3 between the first part 26 and the second part 27 of the outer crowning portion 16.

With this configuration, as shown in FIG. 6, the tilt angle of the roller 11 is small (less than 3°). The first part 26 of the outer crowning portion 16 of the roller 11 therefore contacts the flat surface 36a of the cage pocket 13. As described above, the radius of curvature of the arc-shaped generatrix of the first part 26 is larger than that of the arc-shaped generatrix of the second part 27 (r1>r2). Accordingly, a relatively large contact ellipse is generated between the flat surface 36a and the first part 26. A specific load in the contact portion between the roller 11 and the cage 12 is thus reduced, and wear is restrained. This configuration satisfies "first dimension Z1>second dimension Z2>third dimension Z3".

In the present disclosure (see FIG. 3), a fourth dimension Z4 of the roller 11 defined as follows is smaller than a fifth dimension Z5 of the cage pocket 13 defined as follows (Z4<Z5).

Fourth dimension Z4: the dimension in the radial direction from the first end face 21 of the roller 11 that is contactable with the protrusion 37 of the cage pocket 13 to a boundary B4 between the inner crowning portion 17 and the cylindrical portion 15.

Fifth dimension Z5: the dimension in the radial direction from the contact point P1 of the protrusion 37 of the cage pocket 13 with the first end face 21 of the roller 11 to a boundary B5 (the boundary B5 is the boundary between the flat surface 36d on the radial inner side and the recessed surface 35b).

As described above, the fourth dimension Z4 is smaller than the fifth dimension Z5. Accordingly, when the bearing 10 rotates and the roller 11 is tilted in the cage pocket 13, the inner crowning portion 17 of the roller 11 comes into contact with the flat surface 36d on the radial inner side, as shown in FIG. 6. As described above, the inner crowning portion 17 is formed so as to have an arc-shaped generatrix. The inner crowning portion 17 of the roller 11 therefore contacts (point contacts) the flat surface 36d of the cage pocket 13 in such a manner that a contact ellipse is generated. This configuration reduces the sliding frictional resistance in the contact portion between the roller 11 and the cage 12 and achieves reduction in torque.

For example, although not shown in the figure, when the rotation direction of the bearing 10 is reversed and the roller 11 is tilted in the opposite direction to that shown in FIG. 6, the inner crowning portion 17 comes into contact with the opposite flat surface 36b. In this case as well, the inner crowning portion 17 of the roller 11 contacts (point contacts) the flat surface 36b of the cage pocket 13 in such a manner that a contact ellipse is generated.

In the present disclosure (see FIG. 3), a sixth dimension Z6 defined as follows is larger than the fifth dimension Z5 (Z6>Z5).

Sixth dimension Z6: the dimension in the radial direction from the first end face 21 that is contactable with the protrusion 37 to the boundary B6 between the third part 28 and the fourth part 29 of the inner crowning portion 17.

With this configuration, as shown in FIG. 6, the tilt angle of the roller 11 is small (less than 3°). The third part 28 of the inner crowning portion 17 of the roller 11 therefore contacts the flat surface 36d of the cage pocket 13. As described above, the radius of curvature of the arc-shaped generatrix of the third part 28 is larger than that of the arc-shaped generatrix of the fourth part 29 (r3>r4). Accordingly, a relatively large contact ellipse is generated between the flat surface 36d and the third part 28. A surface pressure in the contact portion between the roller 11 and the cage 12 is thus reduced, and wear is restrained. This configuration satisfies "fourth dimension Z4<fifth dimension Z5<sixth dimension Z6."

In FIG. 3, the convex round portion 48 is provided at the boundary B2 between the flat surface 36a on the radial outer side of the cage pocket 13 and the recessed surface 35a, as described above. Accordingly, no edge load is applied even when the outer crowning portion 16 of the roller 11 contacts the boundary B2. The convex round portion 49 is provided at the boundary B5 between the flat surface 36d on the radial inner side of the cage pocket 13 and the recessed surface 35b, as described above. Accordingly, no edge load occurs even when the inner crowning portion 17 of the roller 11 contacts the boundary B5.

In FIG. 3, according to the configuration in which the first dimension Z1>the second dimension Z2 and the fourth dimension Z4<the fifth dimension Z5, the cylindrical portion 15 of the roller 11 is present within the radial range of the recessed surface 35a (35b) in the cage pocket 13 with the first end face 21 of the roller 11 being in contact with the protrusion 37. Accordingly, when the bearing 10 rotates and the roller 11 is tilted in the cage pocket 13 as shown in FIG. 6, the outer crowning portion 16 and the inner crowning portion 17, each formed so as to have an arc-shaped generatrix, come into contact with the flat surfaces 36a, 36d of the cage pocket 13 on the radial outer and inner sides. As described above, each of the outer crowning portion 16 and the inner crowning portion 17 is formed so as to have an arc-shaped generatrix. The roller 11 and the cage 12 therefore contact (point contact) each other on the radial outer and inner sides in such a manner that a contact ellipse is generated. This configuration reduces the sliding frictional resistance in the contact portion between the roller 11 and the cage 12 and achieves reduction in torque.

As described above, according to the thrust roller bearing 10 of the present disclosure, the sliding frictional resistance in the contact portion between the roller 11 and the cage 12 is reduced. Reduction in torque of the thrust roller bearing 10 is thus achieved. Moreover, a temperature increase due to sliding contact between the roller 11 and the cage 12 is restrained.

The embodiment disclosed herein is illustrative in all aspects and not restrictive. The scope of the disclosure is not limited to the above embodiment but includes all modifications that are included in the scope equivalent to the configurations described in the claims.

What is claimed is:
1. A thrust roller bearing, comprising:
a plurality of rollers arranged between a first raceway surface and a second raceway surface that face each other; and
a cage having a plurality of cage pockets each holding the roller such that a central axis of the roller extends in a radial direction, the roller including a cylindrical outer peripheral surface, a first end face on a radial outer side, and a second end face on a radial inner side, and the cage pocket including an outer surface having a protrusion that is contactable with the first end face, an inner surface facing the second end face, a first side surface on one side and facing the cylindrical outer peripheral surface, and a second side surface on the other side and facing the cylindrical outer peripheral surface, wherein
the rollers and the cage are configured to satisfy the following expression (1)

$$(Y1+Y2)/X<\tan(3\times\pi/180) \quad (1)$$

where
- Y1 represents a clearance, before skewing, between a first contact point of the roller at which the roller contacts the first side surface when the roller is skewed toward one side and the first side surface,
- Y2 represents a clearance, before skewing, between a second contact point of the roller at which the roller contacts the second side surface when the roller is skewed toward the one side and the second side surface, and
- X represents a difference between a radius of a first imaginary circle about a central axis of the cage that passes through the first contact point and a radius of a second imaginary circle about the central axis of the cage that passes through the second contact point.

2. The thrust roller bearing according to claim 1, wherein
the roller includes a cylindrical portion located in the middle of the roller in an axial direction of the roller and having a straight generatrix, an outer crowning portion located radially outward of the cylindrical portion and having an arc-shaped generatrix, and an inner crowning portion located radially inward of the cylindrical portion and having have an arc-shaped generatrix, each of the first side surface and the second side surface includes a recessed surface that is provided in the middle of the cage pocket in the radial direction and that is not contactable with the roller, and flat surfaces that are provided on radial outer and inner sides in the cage pocket and that is contactable with the roller, and a first dimension is larger than a second dimension, the first dimension being a dimension in the radial direction from the first end face that is contactable with the protrusion to a boundary between the outer crowning portion and the cylindrical portion, and the second dimension being a dimension in the radial direction from a contact point of the protrusion with the first end face to a boundary between the flat surface on the radial outer side and the recessed surface.

3. The thrust roller bearing according to claim 2, wherein:
the outer crowning portion includes a first part adjacent to the cylindrical portion and defined by an arc-shaped generatrix with a first radius of curvature, and a second part adjacent to the first part and defined by an arc-shaped generatrix with a second radius of curvature smaller than the first radius of curvature; and a third dimension is smaller than the second dimension, the third dimension being a dimension in the radial direction from the first end face that is contactable with the protrusion to a boundary between the first part and the second part.

* * * * *